(12) United States Patent
Miller

(10) Patent No.: US 8,568,211 B2
(45) Date of Patent: Oct. 29, 2013

(54) DAMPER FOR POSITIVE PRESSURE AIR CLEANER

(76) Inventor: Gregory R. Miller, Washington, MO (US)

(*) Notice: Subject to any disclaimer, the term of this patent is extended or adjusted under 35 U.S.C. 154(b) by 805 days.

(21) Appl. No.: 12/176,957

(22) Filed: Jul. 21, 2008

(65) Prior Publication Data

US 2009/0023376 A1 Jan. 22, 2009

Related U.S. Application Data

(60) Provisional application No. 60/950,789, filed on Jul. 19, 2007, provisional application No. 60/956,056, filed on Aug. 15, 2007.

(51) Int. Cl.
*F24F 7/06* (2006.01)
*F24F 7/00* (2006.01)

(52) U.S. Cl.
USPC .......................................... 454/230; 454/334

(58) Field of Classification Search
USPC ................................................ 454/230, 334
See application file for complete search history.

(56) References Cited

U.S. PATENT DOCUMENTS

| | | | |
|---|---|---|---|
| 4,336,748 A * | 6/1982 | Martin et al. | 454/235 |
| 5,099,836 A | 3/1992 | Rowland et al. | |
| 6,221,314 B1 | 4/2001 | Bigelow | |
| 6,500,387 B1 | 12/2002 | Bigelow | |
| 7,578,734 B2 * | 8/2009 | Ahmed et al. | 454/334 |
| 2005/0164625 A1 * | 7/2005 | Kim et al. | 454/230 |
| 2006/0177356 A1 * | 8/2006 | Miller | 422/121 |

OTHER PUBLICATIONS

Website AllergyBuyersClub.com, pp. 1-6.

* cited by examiner

*Primary Examiner* — Steven B McAllister
*Assistant Examiner* — Helena Kosanovic
(74) *Attorney, Agent, or Firm* — Morgan, Lewis & Bockius LLP (57) ABSTRACT

The invention is a damper that closes off supply duct air when the unit is off to prevent air from exiting through the outlet, and opens when the unit is on to allow room air and/or supply duct air to exit through an outlet. The damper may be either motorized or mechanically biased.

17 Claims, 7 Drawing Sheets

DAMPER FOR POSITIVE PRESSURE AIR CLEANER

CROSS-REFERENCE TO RELATED APPLICATIONS

This application claims priority to U.S. provisional patent application No. 60/950,789 filed Jul. 19, 2007. The application also claims priority to U.S. provisional patent application No. 60/956,056 filed Aug. 15, 2007.

STATEMENT REGARDING FEDERALLY SPONSORED RESEARCH

Not Applicable.

APPENDIX

Not Applicable.

BACKGROUND OF THE INVENTION

1. Field of the Invention

The present invention relates to a damper for a positive pressure air cleaner.

2. Related Art

A positive pressure air cleaner is disclosed in U.S. Published Patent Application No. 2006/0177356.

SUMMARY OF THE INVENTION

The invention is a damper arrangement for an air cleaner. The damper closes off supply duct air when the unit is off to prevent air from exiting through the outlet, and opens when the unit is on to allow room air and/or supply duct air to exit through an outlet. The damper controls air flow from two sources, and then exhausts air to one of the two sources. In particular, the damper of the present invention is in fluid communication with both a closed loop supply duct system and ambient room air. The damper always permits some flow of air from the closed loop supply duct system to supply positive air pressure to the room, but may selectively allow or completely deny drawing air from the ambient room. After passing through the damper, the air is filtered and then exits to the ambient room.

The damper may be motorized, or may be mechanically biased using a spring.

The louvers that allow room air into the air cleaner may be adjusted from a fully open position to a fully closed position. The air louvers may be adapted to provide an air inlet cross-sectional area that is smaller than the cross-sectional area of the supply duct.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
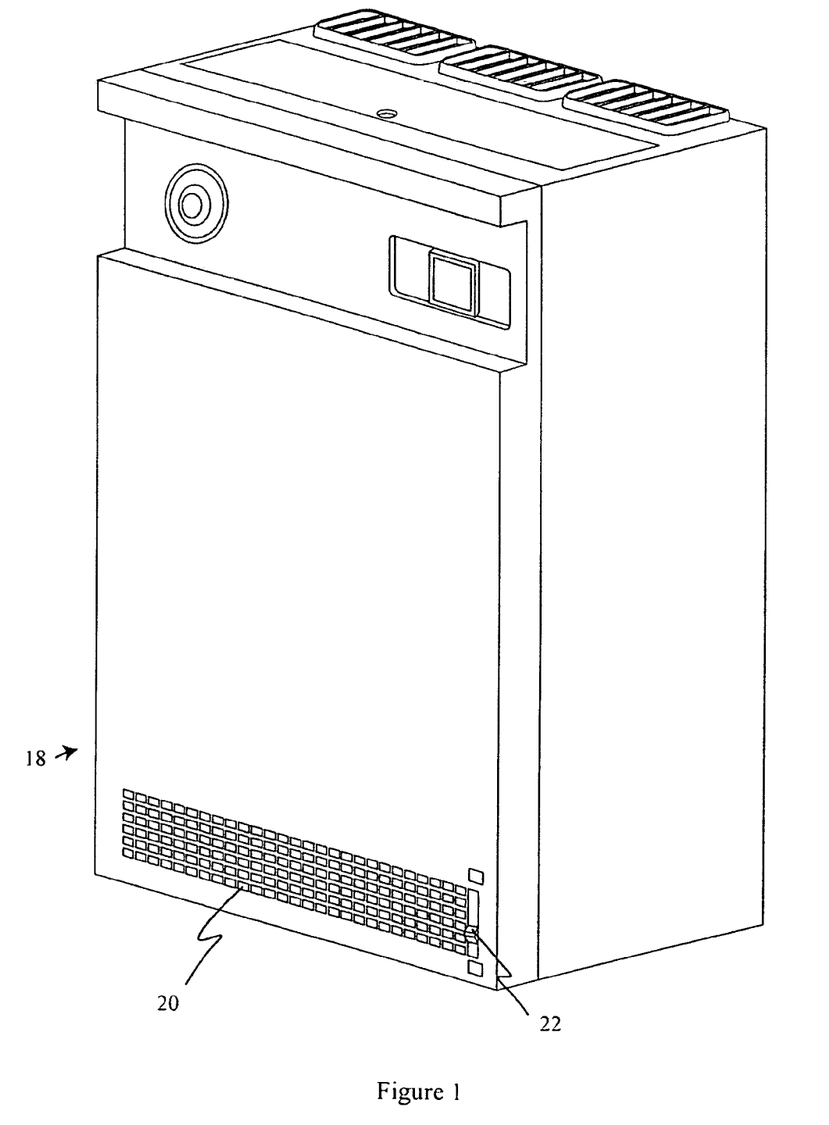
FIG. 1 is an elevated view of a first embodiment of the air cleaner of the present invention having a first room air grill.

FIG. 1 illustrates a perspective view of the air cleaner of the present invention. In this air cleaner, shown generally at 18, a first grill 20 is shown, with an adjustment slide-type damper 22 that allows room air to pass through first grill 20 into air cleaner 18.

Figure 2:
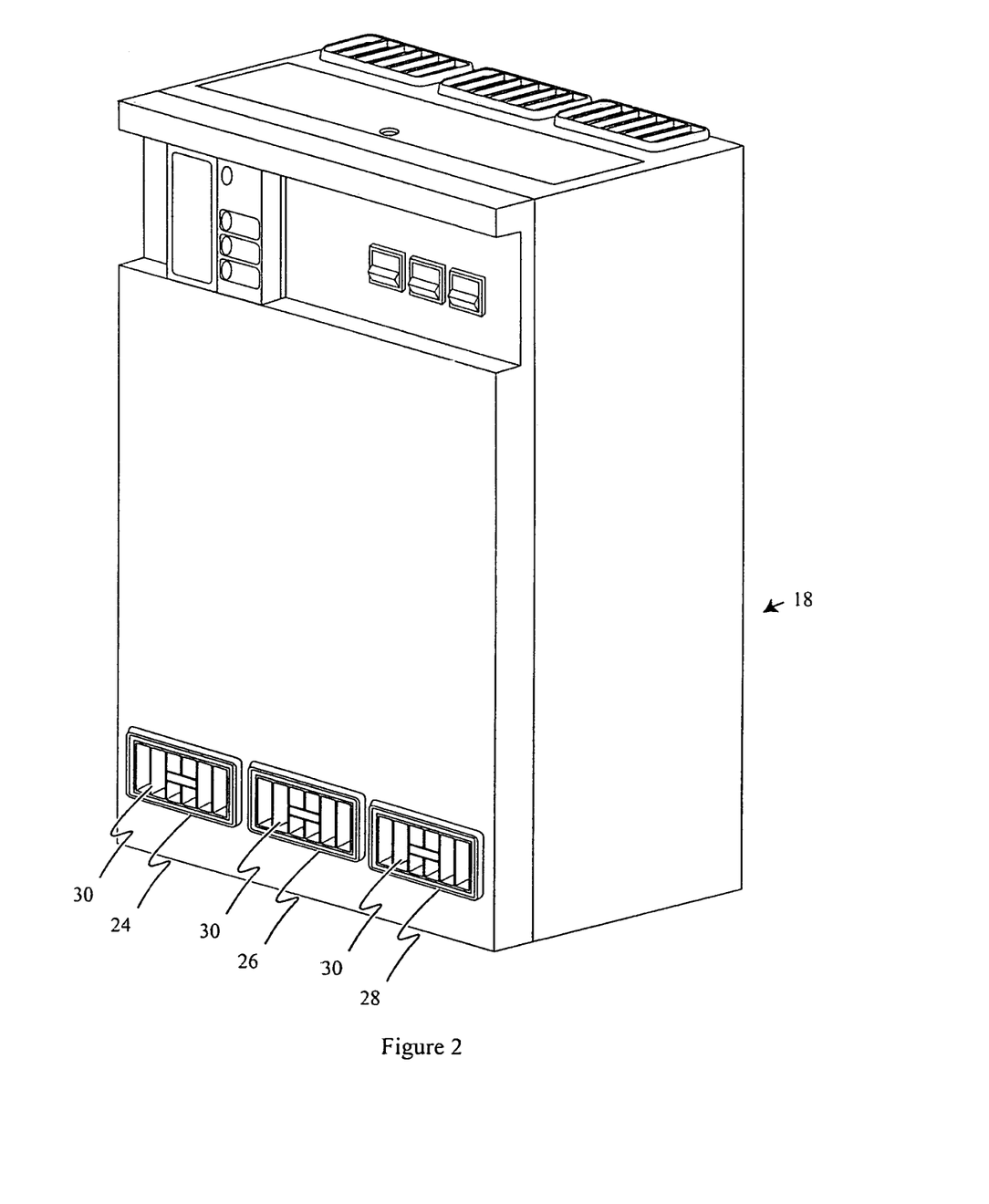
FIG. 2 is an elevated view of a second embodiment of the air cleaner of the present invention having a second room air grill.

FIG. 2 illustrates an alternate embodiment in which a second grill 24, third grill 26, and fourth grill 28 are provided. Each grill, 24, 26, and 28 is provided with a second adjustment slide-type damper 30 that allows room air to pass through the grills, 24, 26, and 28 into air cleaner 18.

Figure 3:
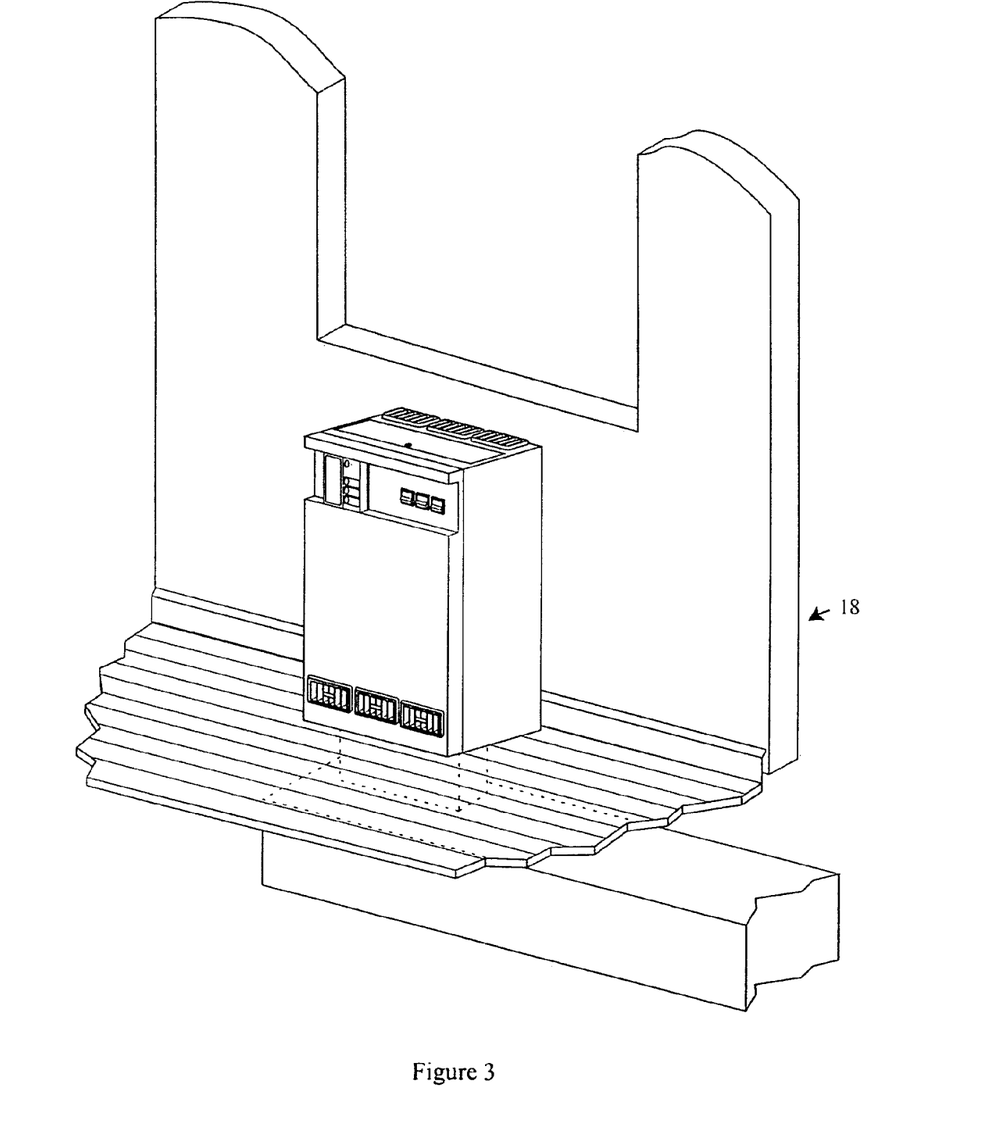
FIG. 3 is an elevated view of the second embodiment of the air cleaner shown in FIG. 2, with a partial cutaway of the floor to illustrate a supply duct.

FIG. 3 shows the alternate embodiment installed over a supply duct which runs under a floor.

Figure 4:
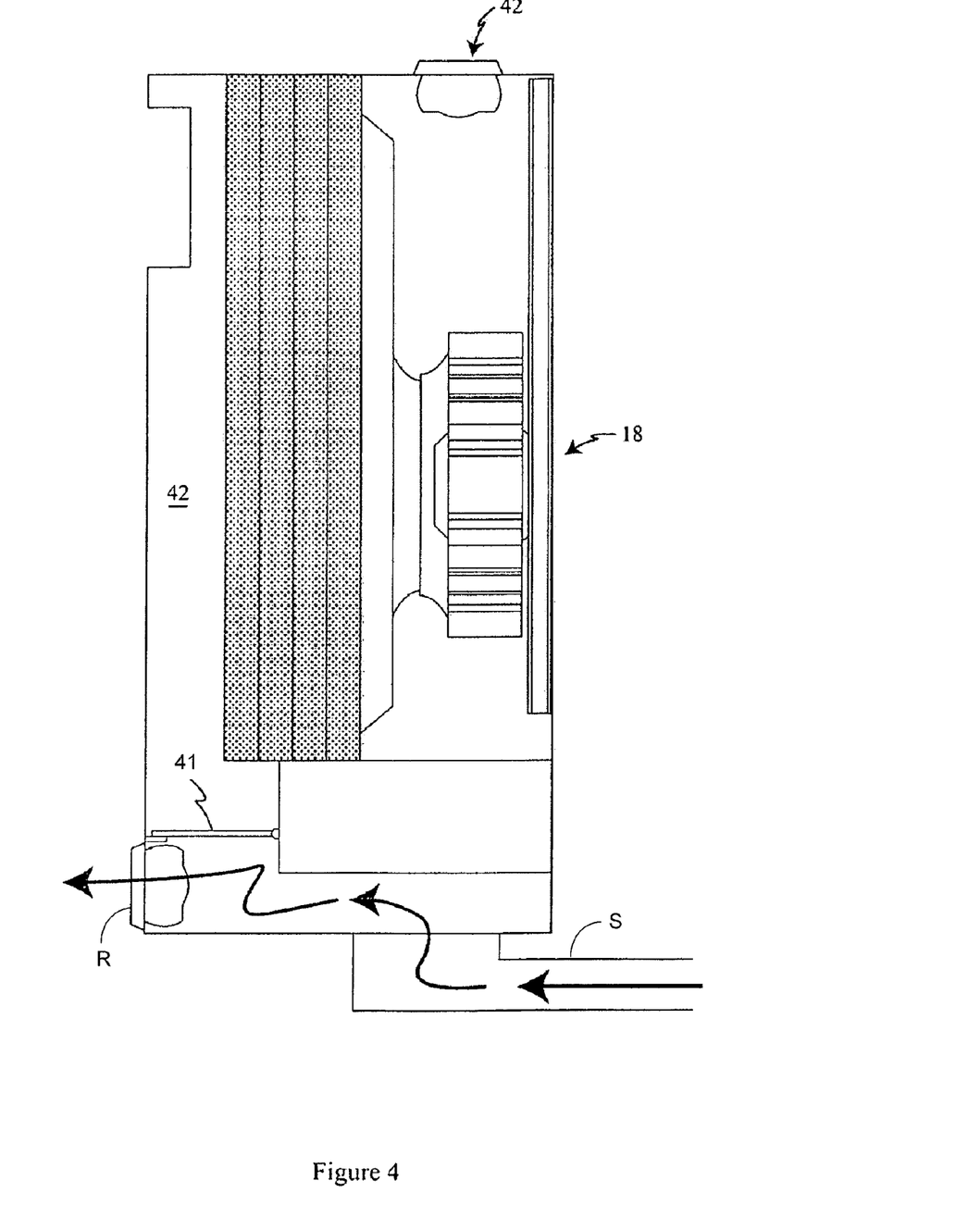
FIG. 4 is a side section view of the air cleaner of the present invention in the "off" position.

FIG. 4 shows the damper 41 in a closed position, and the air cleaner 18 "off." The supply duct S air exits through either first grill 20, or second, third, or fourth grills, 24, 26, 28, such grills being generally designated R in FIG. 4.

Figure 5:
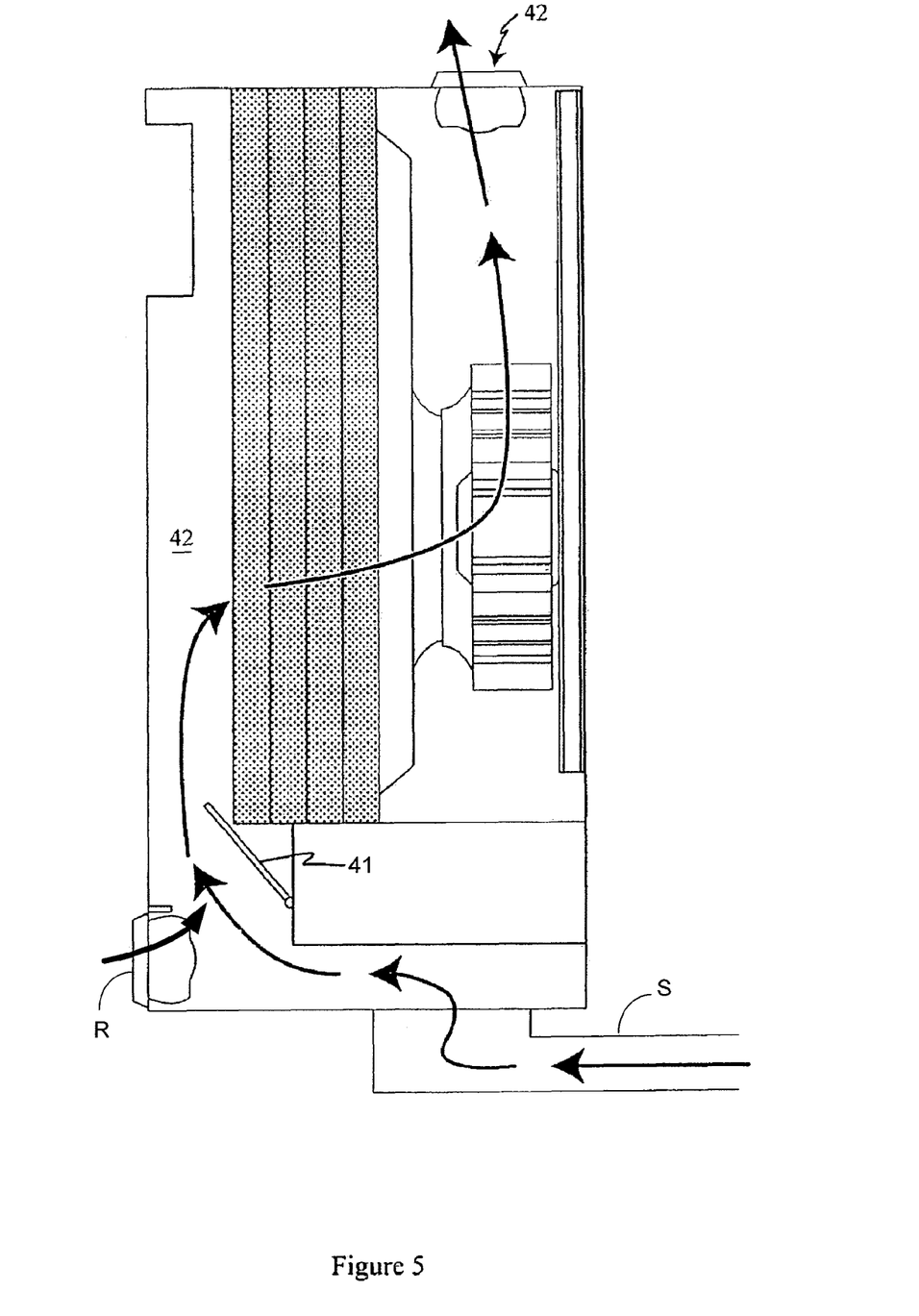
FIG. 5 is a side section view of the air cleaner of the present invention in the "on" position.

FIG. 5 shows the damper 41 in the open position, and the air cleaner 18 "on" in which the fan is pulling air from the supply duct S and the room air inlet R. The air from the room air inlet R and the supply duct S mix and then travel to the outlet 42. Within the exit path of outlet 42, there is shown a series of air filters for cleaning the air as it flows through the outlet. The air cleaner 18 (which is a positive pressure air purification unit) is shown disposed such that its supply duct inlet S is in fluid communication with supply duct air from a closed loop supply duct. More particularly, the positive pressure air purification unit 18 is disposed on top of the closed loop supply duct. The closed loop supply duct S is a conventional one such as those found in homes with central air conditioning and heating where a duct system that does not obtain air from outside the house or enclosure delivers heated or cooled air via a forced air duct system.

Figure 6:
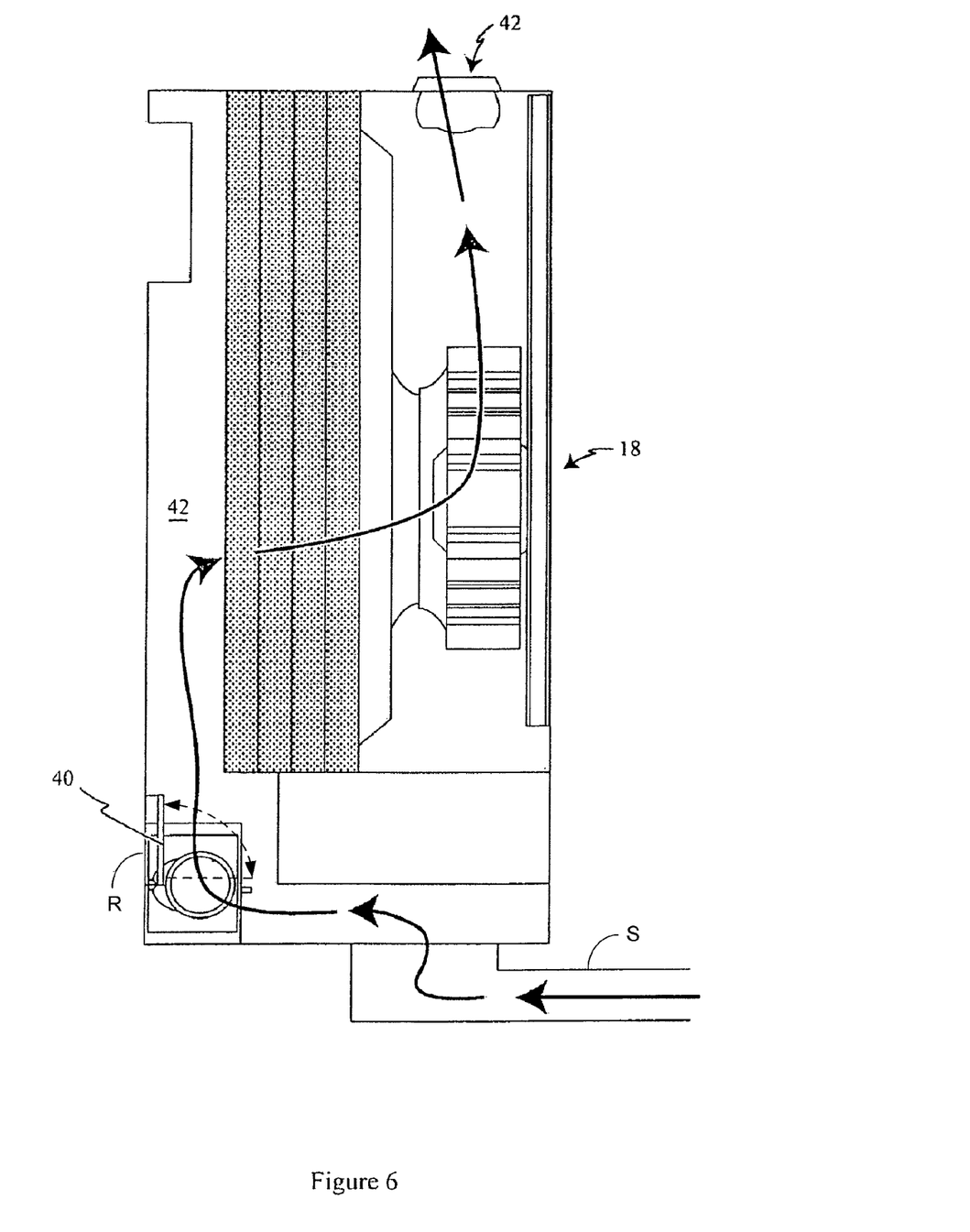
FIG. 6 is a side section view of an air cleaner of the present invention with the motorized damper in a closed position relative to inlet room air.

The air cleaner 18, alternately referred to as a positive pressure air purification unit 18, also has a room air inlet which may be variably positioned between an open position and a closed position, which determines whether air may be drawn from the room into the positive pressure air purification unit 18. When in a closed position as shown in FIG. 6, the room air inlet does not allow air to flow from the room into the positive pressure air purification unit. When in an open position as shown in FIG. 7, the room air inlet allows air to pass into the positive pressure air purification unit 18.

The motorized damper 40 travels between a first position and a second position. In the first position shown in FIG. 6, the motorized damper 40 prevents air from entering into the positive pressure air purification unit 18 from the room air inlet R, but allows an unrestricted air path for supply duct S air to enter the positive pressure air purification unit 18 from the exterior thereof. This arrangement maximizes the opportunity for room temperature control and further maximizes the level of positive air pressure in the room.

Figure 7:
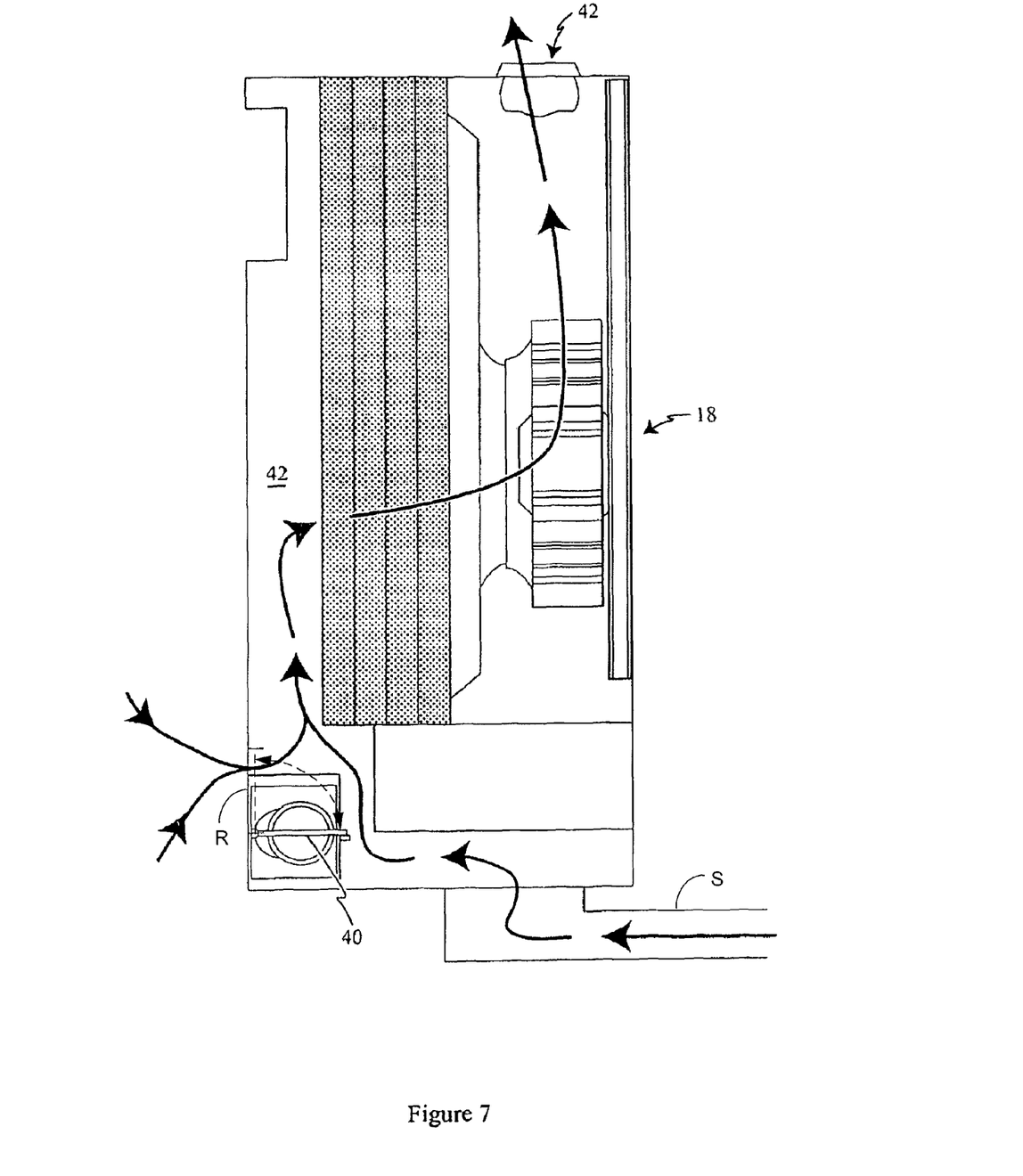
FIG. 7 is a side section view of the air cleaner according to FIG. 6, with the motorized damper in an open position relative to inlet room air.

In the second position shown in FIG. 7, the motorized damper 40 permits air to enter into the positive pressure air purification unit 18 from the room air inlet R, and also allows supply duct S air to simultaneously enter the positive pressure air purification unit 18. It should be noted that in this second position, the damper 40 restricts but does not completely eliminate air sourced from the supply duct S. This second position of the motorized damper 40 also ensures that positive air pressure is provided in the room.

In both positions of the motorized damper 40, it is understood that the air flow is drawn through the positive pressure air purification unit 18 by a fan. Accordingly, there can be no air flow without the fan in operation, unless the supply duct is itself delivering forced air through the central heating and air conditioning system. As a result, it is important to the present invention that a positive air pressure is maintained, and that the air exiting the positive pressure air purification unit 18 be purified (e.g. allergens, dust, dirt, pollen, smells, etc.). Positive pressure in a room prevents the further entry and contamination of room air by second hand smoke, allergens, dust, dirt, pollen, etc.

As various modifications could be made to the exemplary embodiments, as described above with reference to the corresponding illustrations, without departing from the scope of the invention, it is intended that all matter contained in the foregoing description and shown in the accompanying drawings shall be interpreted as illustrative rather than limiting. Thus, the breadth and scope of the present invention should not be limited by any of the above-described exemplary embodiments, but should be defined only in accordance with the following claims appended hereto and their equivalents.

What is claimed is:

1. A positive pressure air purification system comprising:
   a forced air duct system and
   a unit including a housing, a fan, an air filter, and a damper, wherein:
      said housing has a room air inlet, an outlet, and a supply duct air inlet connected to a forced air duct system;
      said fan is disposed in said housing between the damper and the outlet;
      said air filter is disposed in said housing;
      said damper is disposed in said housing and adapted for movement between a first position and a second position;
   wherein the positive pressure air purification system when said damper is in said first position allows air to pass through said forced air duct system, through said supply duct air inlet, through said air filter to said outlet and prevents air from said room air inlet to pass through said air filter; and
   wherein the positive pressure air purification system when said damper is in said second position allows air said forced air duct system, through said supply duct air inlet, through said air filter to said outlet and allows air from said room air inlet to pass through said air filter to said outlet.

2. The positive pressure air purification system of claim 1, wherein said forced air duct system is a closed loop supply duct system.

3. The positive pressure air purification system of claim 1, wherein said damper is adjustable between various positions between said first position and said second position.

4. The positive pressure air purification system of claim 1, wherein said damper is adapted to reduce, but not completely eliminate, air flow sourced from said supply duct air inlet to thereby provide continuous positive air pressure to the room when the positive pressure air purification system is operating.

5. The positive pressure air purification system of claim 1, further comprising a mixing chamber configured to allow air received from said room air inlet and said supply duct air inlet to mix together.

6. A positive pressure air purification system comprising:
   a housing having a forced air duct system and:
      a room air inlet configured to fluidly receive room air,
      a supply duct inlet configured to be installed on top of a supply duct register of a forced air duct system to fluidly receive forced air; and
      a outlet configured to expel air; and
   a single damper configured to:
      (1) always allow air from said forced air duct system to pass from said supply duct inlet through said housing to said outlet; and
      (2) selectively allow or disallow room air to pass from said room air inlet through said housing to said outlet.

7. The air purification system of claim 6, wherein said single dampener has a first position which allows air from said forced air duct system to pass from said supply duct inlet through said housing to said outlet.

8. The air purification system of claim 7, wherein said first position prevents air from said room air inlet to pass through said housing to said outlet.

9. The air purification system of claim 7, wherein the single damper is configured to rotate between at least the first position and a second position.

10. The air purification system of claim 6, wherein said forced air duct system is configured to receive heated or cooled air from a closed loop heating or cooling system.

11. The air purification system of claim 6, wherein said forced air duct system does not provide outside air to the supply duct air inlet.

12. The air purification system of claim 9, further comprising a fan disposed in said housing, such that when the single dampener is in the second position, said fan draws air from both said supply duct inlet and from said room air inlet through said housing to said outlet.

13. The air purification system of claim 9, further comprising an air filter disposed in said housing, such that when the single dampener is in the second position, air from both said supply duct inlet and from said room air inlet to pass through said air filter disposed in the housing to said outlet.

14. The air purification system of claim 12, wherein the fan is disposed between the single damper and the outlet.

15. The air purification system of claim 14, further comprising an air filter disposed between the single dampener and the fan.

16. The air purification system of claim 6, wherein the single dampener comprises a single rotatable flap.

17. The air purification system of claim 6, wherein air purification system is configured to be removably attached to a floor supply duct register.

* * * * *

UNITED STATES PATENT AND TRADEMARK OFFICE
CERTIFICATE OF CORRECTION

| | | |
|---|---|---|
| PATENT NO. | : 8,568,211 B2 | Page 1 of 1 |
| APPLICATION NO. | : 12/176957 | |
| DATED | : October 29, 2013 | |
| INVENTOR(S) | : Gregory R. Miller | |

It is certified that error appears in the above-identified patent and that said Letters Patent is hereby corrected as shown below:

In the claims

Claim 1, col. 3, line 45, please delete "a forced air duct system" and add --the forced air duct system--.

Claim 1, col. 3, line 59, between the words "allows air" and "said" please insert --to pass through--.

Claim 6, col. 4, line 16, delete "a housing having a forced air duct system and", please replace with --a forced air duct system and a housing having--.

Signed and Sealed this
Eighteenth Day of March, 2014

Michelle K. Lee
*Deputy Director of the United States Patent and Trademark Office*